L. S. Fairchild,
Cutting Shingles.
N° 34,396.  Patented Feb. 11, 1862.
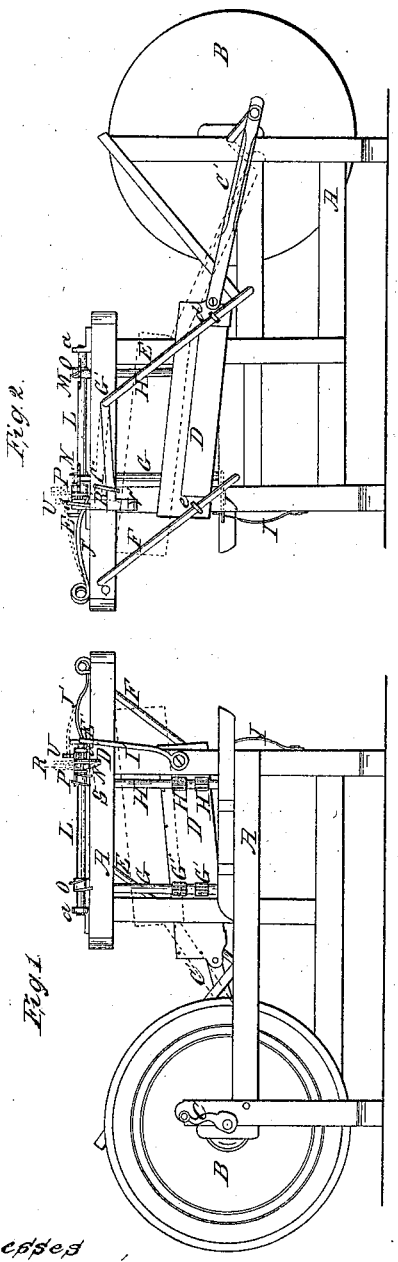
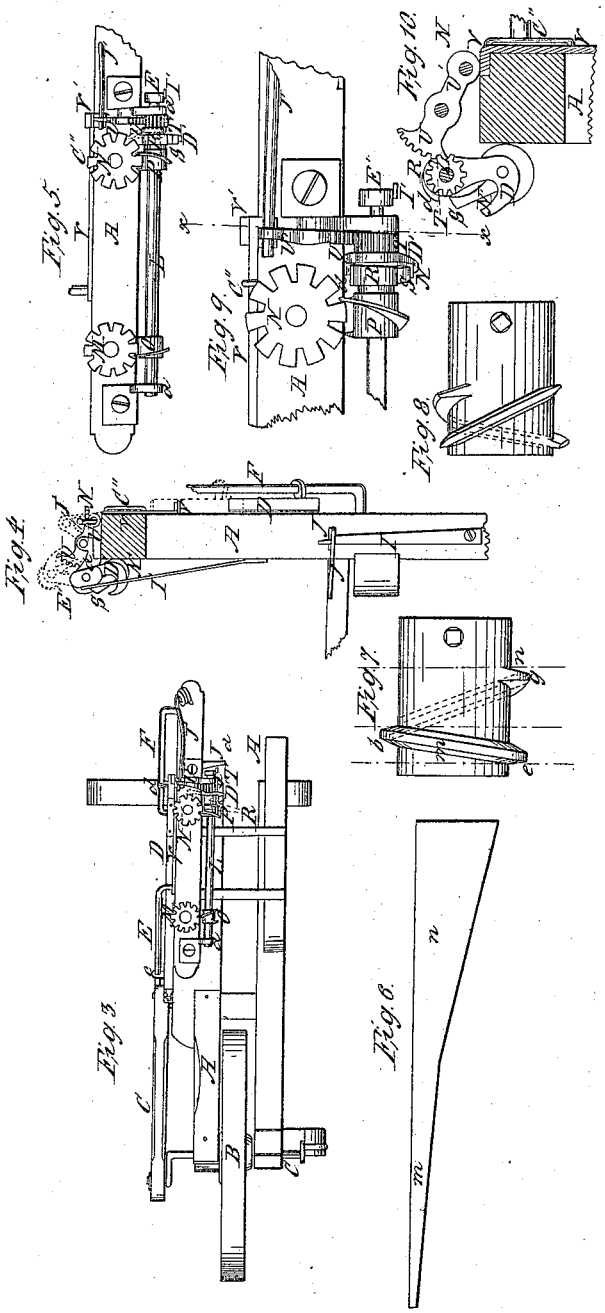
Inventor
L S Fairchild

UNITED STATES PATENT OFFICE.

LEVI S. FAIRCHILD, OF CLEVELAND, OHIO, ASSIGNOR TO HIMSELF, ALONZO HAZEN, AND ALONZO M. HAZEN, OF SAME PLACE, AND A. J. WHITING, OF PERRY, OHIO.

IMPROVEMENT IN SHINGLE-MACHINES.

Specification forming part of Letters Patent No. 34,396, dated February 11, 1862.

*To all whom it may concern:*

Be it known that I, LEVI S. FAIRCHILD, of Cleveland, in the county of Cuyahoga and State of Ohio, have invented certain new and useful Improvements in Shingle-Machines; and I do hereby declare that the following is a full and complete description of the construction and operation of the same, reference being had to the accompanying drawings, making a part of this specification, in which—

Figures 1 and 2 are side views. Fig. 3 is a top view. Figs. 4, 5, 6, 7, 8, 9, and 10 are enlarged detached sections. Fig. 10 is a section of Fig. 9 in the direction of the line $xx$.

The same letters of reference refer to like parts in the different views.

My improvement relates to the manner of feeding the bolt or block to the knife by a certain arrangement of devices to insure with certainty the effectual cutting of shingles of the required size at the butt and point alternately off the block, as hereinafter described.

In the figures, A represents the frame of the machine; B, a wheel operated by the crank C. To the shaft passing through the wheel B is attached the connecting-rod C', that is secured to the knife D, as shown in Fig. 2, which is kept in place by the guides $c$ and $d$, moving on the slides E and F as the knife is raised and lowered.

G and H are shafts passing through the upper part of the frame, on the top of which are secured the gear-wheels M and N. (Seen in Figs. 3, 5, and 9.) On each of these shafts are two feed-rollers G' and H', Fig. 1, that move the block out, which is placed between them and rests on the frame. In order that the distance between the rollers can be adjusted to suit the length of any block, the lower end of the shaft H turns in a slide J, that moves in a slot in the frame, as indicated by the dotted lines in Fig. 2, and is kept in place by the spring I, passing through the end of it.

L is a shaft supported by the bearings $a\,a$, secured to the top of the frame. On this shaft opposite the gears M and N are secured intermittent screws O and P, also the cam R, in which the dog S operates. The dog S and pinion T are connected and move independently on the shaft. The segment-gear U works in the pinion T, and is operated by the lever V and spring J'. The end of the lever V is pivoted to the frame at G', Fig. 2, and is kept in place by the guide C'' as it is moved up and down. Enlarged views of these parts are shown in the detached sections, and the manner in which they operate will be described as follows:

By turning the crank the knife D moves upon the slides E and F, coming against the lip V' of the lever V, forcing it up, as indicated by the dotted lines in Figs. 2 and 4, and as the arm U' of the segment-gear U rests on the top of this lever, as seen in Figs. 9 and 10, it is elevated, turning the pinion T until the dog S and its connections are in the position indicated by the dotted lines in Fig. 4. In this operation the dog S comes up against the catch $d$ of the cam R, as shown in Fig. 10, which turns the shaft with the screws half-way round, operating the gears and moving out the block. The shaft L is prevented from reversing its motion, which would produce back action to the feed-rollers and remove the block from under the knife when the dog is turned back by the spring I' pressing against the elongated cam E' on the end of the shaft. The shaft being in this way rendered stationary, when the knife descends, the pressure being removed from the lever V, the spring J', passing through the arm U' of the segment-gear U, causes it to turn the dog back over the cam R to its former position.

There is a catch $d$ on each side of the cam R, so that every time the knife is raised the shaft is turned half-way round by the action of the dog on the cam.

D' is an arm that connects the dog to the pinion T, and N' is a spring to prevent the dog from getting out of place, so as not to operate on the catches $d$ of the cam.

From the peculiar construction of the screws O and P (represented by Figs. 6 and 7) one end of the bolt is in the same time and with the same operation moved out farther than the other. The inclination or lead of the first half of the screw is represented by $m$ in Fig. 6, while $n$ represents the lead of the other half, which is so much greater, as is also shown by the red lines in Fig. 7. It is evident that a gear will be thrown much farther by the screw of greater lead or in passing from *b* to *g* than in passing from *e* to *b*. Consequently if the screws O and P are placed on the shaft L opposite each other, or so that when one gear is operated by the screw of greater lead the other one will be operated by the lesser, one gear will be thrown round farther than the other alternately, thus moving one end of the block out beyond the other, cutting it every time at an opposite angle, until the entire bolt is converted into shingles of the usual form. To render it still more sure in its operations, a double screw may be used, as shown in Fig. 8, in which there will be two continuous threads working in the gears.

What I claim as my improvement, and desire to secure by Letters Patent, is—

1. The intermittent screws O and P, gears M and N, cam R, dog S, and cam E', when arranged and operating substantially in the manner and for the purpose set forth.

2. The lever V, spring J', and segment-gear U, in combination with the dog S, cam E', and spring I', in the manner and for the purpose described.

LEVI S. FAIRCHILD.

Witnesses:
W. H. BURRIDGE,
A. J. WHITING.